No. 647,990. Patented Apr. 24, 1900.
W. W. SALISBURY.
GRAIN CLEANER AND SCOURER.
(Application filed Sept. 6, 1899.)
(No Model.)
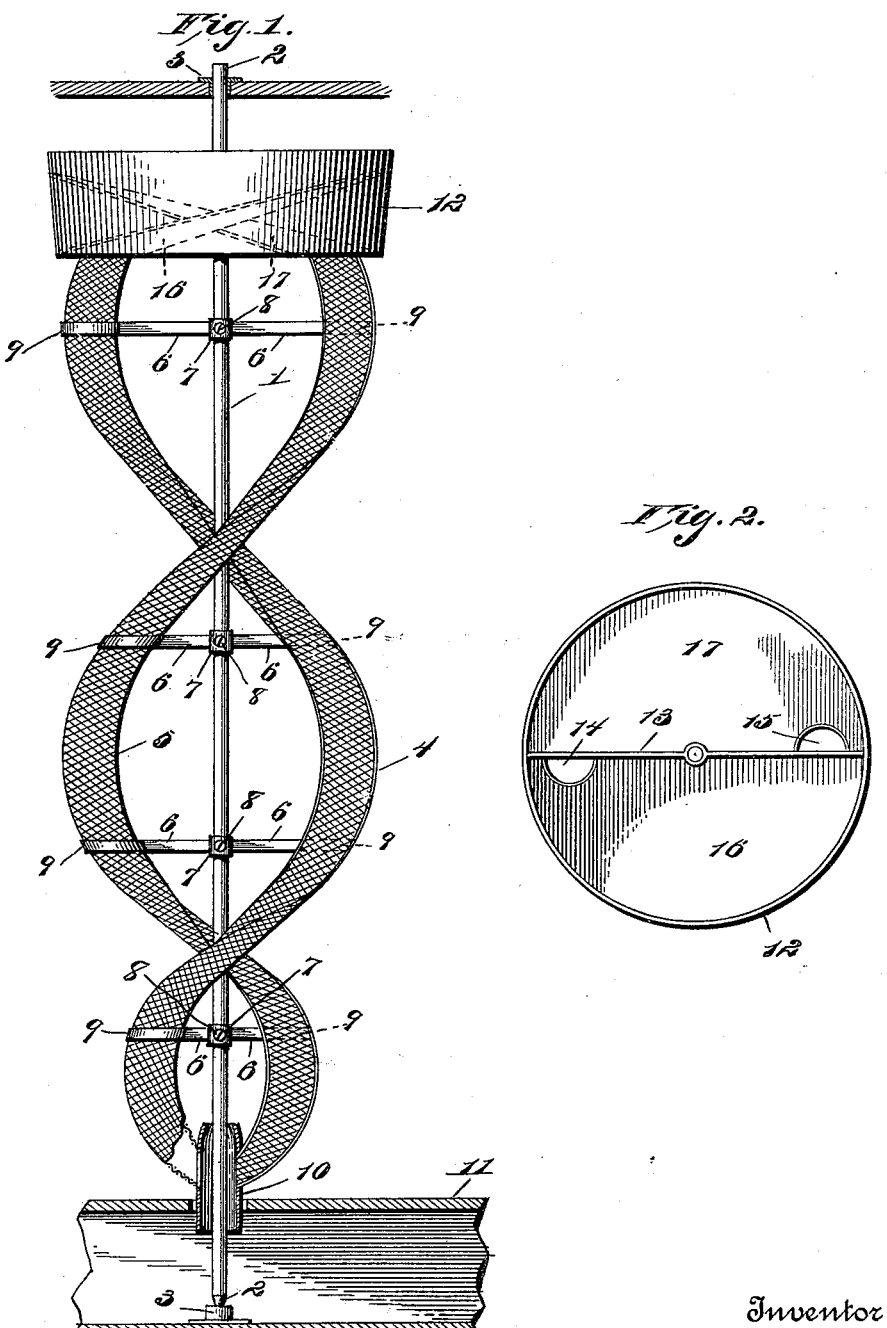

UNITED STATES PATENT OFFICE.

WILLIAM W. SALISBURY, OF BEREA, OHIO.

GRAIN CLEANER AND SCOURER.

SPECIFICATION forming part of Letters Patent No. 647,990, dated April 24, 1900.

Application filed September 6, 1899. Serial No. 729,643. (No model.)

*To all whom it may concern:*

Be it known that I, WILLIAM W. SALISBURY, a citizen of the United States, residing at Berea, in the county of Cuyahoga and State of Ohio, have invented certain new and useful Improvements in Grain Cleaners and Scourers, of which the following is a specification.

My invention relates to grain cleaners and scourers; and the object is to provide a simple and effective apparatus which will revolve automatically as the grain is fed to it.

The construction of the apparatus will be fully described hereinafter in connection with the accompanying drawings and its novel features defined in the appended claims.

In the drawings, Figure 1 is a side elevation, partly in section, of a grain scourer and cleaner embodying the invention; and Fig. 2 is a plan view of the hopper.

The reference-numeral 1 designates a shaft, preferably consisting of gas-pipe and having its ends provided with journals 2, supported in suitable bearings 3. Secured to the shaft 1 are two spirally-disposed troughs 4 and 5, made of wire-netting or like screen material bent to semicircular form in cross-section and twisted spirally around the shaft 1 from opposite sides thereof. These troughs 4 and 5 are secured to the shaft 1 by transverse brace-rods 6, formed centrally with a sleeve 7. The shaft 1 extends through the sleeves 7, and the latter are held upon the shaft by set-screws 8. The ends 9 of the rods 6 are curved to embrace the troughs, as shown. The lower ends of the spiral troughs are connected by a short sleeve 10, with which the troughs communicate and through which the shaft 1 extends, the sleeve being of sufficient diameter to permit the grain to pass through it freely to a bin 11. The upper ends of the troughs are secured to a hopper 12, which is of cylindrical form and provided with a central opening for the shaft, to which the hopper is keyed or otherwise firmly secured. The hopper is divided centrally by a vertical partition 13 and formed with discharge-openings 14 and 15 at opposite sides of the hopper and partition. These openings 14 and 15 permit the grain to feed from the hopper into the troughs. To facilitate this feed, the compartments of the hopper are provided with oppositely-inclined floors 16 and 17, which direct the grain toward the discharge-openings 14 and 15.

The operation of the apparatus is as follows: The grain feeds by gravity from the hopper into the spiral troughs, and the weight of the grain as it falls against the sides of the troughs causes the latter to revolve, carrying with them the hopper and brace-rods 6. The revolving motion and the irregular path of the grain as it passes through the troughs result in an agitation of the grain, which effectually scours and cleans it, the cleaned product being delivered through the discharge sleeve or spout 10.

I claim—

1. A grain scourer and cleaner comprising a revoluble vertical shaft; spirally-disposed troughs secured to said shaft to revolve therewith; and a revolving hopper secured to said shaft and troughs.

2. A grain scourer and cleaner, comprising a revoluble vertical shaft; spirally-disposed troughs consisting of wire-netting or equivalent screen material secured to said shaft; a hopper secured to the upper ends of the troughs; and a receiving-receptacle at the lower ends of the troughs, said troughs being adapted to revolve by the weight of the grain fed to them from the hopper.

3. In a grain scourer and cleaner, the combination with a revoluble vertical shaft; of a hopper secured thereto; spirally-disposed troughs secured to the shaft, and communicating with the hopper; and a discharge-spout secured to the lower ends of the troughs.

4. In a grain scourer and cleaner, the combination with a revoluble vertical shaft, of a hopper secured thereto, and provided with oppositely-arranged feed-openings; spirally-disposed troughs communicating with the openings in the hopper; a series of transverse rods securing the troughs to the shaft; a discharge spout or sleeve connecting the lower ends of the troughs; and a bin or receptacle below said discharge-spout.

In testimony whereof I affix my signature in presence of two witnesses.

WM. W. SALISBURY.

Witnesses:
T. C. MATTISON,
J. S. SIMPSON.